(12) United States Patent
Cosgarea

(10) Patent No.: US 11,970,328 B2
(45) Date of Patent: Apr. 30, 2024

(54) VACUUM SEALABLE CONTAINER WITH INTERNAL PUMP MECHANISM

(71) Applicant: HBL Holdings, LLC, San Francisco, CA (US)

(72) Inventor: Andrew D. Cosgarea, San Francisco, CA (US)

(73) Assignee: HBL Holdings, LLC, San Francisco, CA (US)

( * ) Notice: Subject to any disclaimer, the term of this patent is extended or adjusted under 35 U.S.C. 154(b) by 121 days.

(21) Appl. No.: 17/845,946

(22) Filed: Jun. 21, 2022

(65) Prior Publication Data

US 2022/0380110 A1 Dec. 1, 2022

Related U.S. Application Data

(63) Continuation of application No. 17/094,714, filed on Nov. 10, 2020, now Pat. No. 11,365,041, which is a (Continued)

(51) Int. Cl.
*B65D 81/20* (2006.01)
*A47J 47/10* (2006.01)
(Continued)

(52) U.S. Cl.
CPC .......... *B65D 81/2038* (2013.01); *A47J 47/10* (2013.01); *B65D 43/0225* (2013.01);
(Continued)

(58) Field of Classification Search
CPC ............ B65D 81/2038; B65D 43/0225; B65D 51/1644; B65D 51/1683; B65D 51/24;
(Continued)

(56) References Cited

U.S. PATENT DOCUMENTS

| 35,465 A | 6/1862 | Munson |
| 123,579 A | 2/1872 | Robertson |

(Continued)

FOREIGN PATENT DOCUMENTS

| CN | 1420062 A | 5/2003 |
| CN | 2885761 Y | 4/2007 |

(Continued)

OTHER PUBLICATIONS

Cosgarea, Office Action, U.S. Appl. No. 15/658,330, Apr. 15, 2019, 8 pgs.

(Continued)

*Primary Examiner* — Peter J Bertheaud

(57) ABSTRACT

A pump mechanism for vacuum sealing an airtight cavity formed by a container and a lid, including a bore having a first one-way seal allowing air from the airtight cavity to enter the bore and blocking air inside the bore from returning to the airtight cavity and a second one-way seal allowing air inside the bore to leave the bore without returning to the airtight cavity and blocking air outside of the bore from entering the bore, a piston disposed inside the bore, and a chamber of air enclosed by the bore, the first and second one-way seals, and the piston, wherein actuation of the piston in a first direction causes air to evacuate the airtight cavity and enter the chamber through the first one-way seal, and wherein actuation of the piston in a second direction causes air to exit the chamber through the second one-way seal.

7 Claims, 7 Drawing Sheets

Related U.S. Application Data continuation of application No. 15/658,330, filed on Jul. 24, 2017, now Pat. No. 10,829,290.

(60) Provisional application No. 62/482,022, filed on Apr. 5, 2017, provisional application No. 62/367,541, filed on Jul. 27, 2016.

(51) Int. Cl.
- B65D 43/02 (2006.01)
- B65D 51/16 (2006.01)
- B65D 51/24 (2006.01)
- F04B 33/00 (2006.01)
- F04B 37/14 (2006.01)
- F04B 39/00 (2006.01)
- F04B 39/10 (2006.01)
- F04B 39/12 (2006.01)
- F04B 41/00 (2006.01)
- F04B 49/24 (2006.01)
- F04C 9/00 (2006.01)

(52) U.S. Cl.
CPC ..... *B65D 51/1644* (2013.01); *B65D 51/1683* (2013.01); *B65D 51/24* (2013.01); *B65D 81/2015* (2013.01); *B65D 81/2053* (2013.01); *F04B 33/00* (2013.01); *F04B 37/14* (2013.01); *F04B 39/0005* (2013.01); *F04B 39/005* (2013.01); *F04B 39/10* (2013.01); *F04B 39/122* (2013.01); *F04B 41/00* (2013.01); *F04B 49/24* (2013.01); *F04C 9/002* (2013.01)

(58) Field of Classification Search
CPC .. B65D 81/2015; B65D 81/2053; A47J 47/10; F04B 33/00; F04B 37/14; F04B 39/0005; F04B 39/005; F04B 39/10; F04B 39/122; F04B 41/00; F04B 49/24; F04C 9/002
See application file for complete search history.

(56) References Cited

U.S. PATENT DOCUMENTS

| | | | |
|---|---|---|---|
| 129,864 A | 7/1872 | Rogers | |
| 249,499 A | 11/1881 | Bouvier | |
| 856,215 A | 6/1907 | Bergstrom et al. | |
| 1,497,547 A | 6/1924 | Coletta | |
| 3,281,065 A | 10/1966 | Chaffiotte | |
| 3,313,444 A | 4/1967 | Katell | |
| 4,249,583 A | 2/1981 | Lundbladh | |
| 5,338,166 A | 8/1994 | Schultz | |
| 5,558,243 A | 9/1996 | Chu | |
| 5,564,480 A | 10/1996 | Chen | |
| 5,651,470 A | 7/1997 | Wu | |
| 5,944,212 A * | 8/1999 | Chang | B65D 81/2038 220/DIG. 16 |
| 5,970,924 A | 10/1999 | Pyon | |
| 6,131,753 A * | 10/2000 | Lynch | B65D 51/1683 220/240 |
| 6,557,462 B1 | 5/2003 | Wang | |
| 6,644,489 B2 | 11/2003 | Chang | |
| 6,880,494 B2 | 4/2005 | Hoose | |
| 6,973,945 B2 | 12/2005 | Haimi | |
| 6,994,227 B2 | 2/2006 | Kwon | |
| 7,296,598 B2 * | 11/2007 | Lin | B65D 81/2038 220/240 |
| 7,328,730 B2 | 2/2008 | Vilalta et al. | |
| 7,527,179 B2 | 5/2009 | Haimi | |
| 7,726,354 B2 | 6/2010 | Shlomo | |
| 7,757,725 B2 * | 7/2010 | Wang | B65D 81/2038 220/232 |
| 8,091,742 B2 | 1/2012 | Haimi | |
| 8,113,246 B2 | 2/2012 | Hsieh | |
| 10,829,290 B2 * | 11/2020 | Cosgarea | B65D 51/24 |
| 11,365,041 B2 * | 6/2022 | Cosgarea | F04B 39/10 |
| 2003/0183657 A1 | 10/2003 | Chang | |
| 2005/0051551 A1 | 3/2005 | Galletti et al. | |
| 2015/0101557 A1 | 4/2015 | Reisser | |

FOREIGN PATENT DOCUMENTS

| | | |
|---|---|---|
| DE | 2811460 | 9/1978 |
| FR | 1158362 | 6/1958 |
| FR | 2354445 A1 | 1/1978 |
| GB | 509916 A | 7/1939 |
| KR | 20050071979 A | 7/2005 |

OTHER PUBLICATIONS

Cosgarea, Final Office Action, U.S. Appl. No. 15/658,330, Sep. 11, 2019, 9 pgs.
Cosgarea, Office Action, U.S. Appl. No. 15/658,330, Apr. 24, 2020, 9 pgs.
Cosgarea, Notice of Allowance, U.S. Appl. No. 15/658,330, Aug. 12, 2020, 7 pgs.
Cosgarea, Office Action, U.S. Appl. No. 17/094,714, Sep. 21, 2021, 9 pgs.
Cosgarea, Notice of Allowance, U.S. Appl. No. 17/094,714, Feb. 23, 2022, 9 pgs.
Hypobaric Labs, International Search Report, PCT/US2017/043766, Sep. 27, 2017, 13 pgs.
Hypobaric Labs, International Preliminary Report on Patentability, PCT/US2017/043766, Jan. 29, 2019, 5 pgs.
First Office Action, CN2017800093667, Jan. 22, 2019, 5 pgs, -No Translation Available-.
Notice of allowance, CN2017800093667, Apr. 29, 2019, 1 pgs,.
HBL Holdings, LLC, Patent Certificate, CN2017800093667, Jun. 28, 2019, 4 pgs.
HBL Holdings, LLC, Extended European Search Report, EP17835133.4, Nov. 26, 2019, 8 pgs.
Rollpack Co. Ltd., Patent Application No. KR20040000395, filed Jan. 5, 2004, 26 pgs.
HBL Holdings, LLC, Examination Report No. 1, AU2017301674, Nov. 19, 2019, 4 pgs.
HBL Holdings, LLC, Communication Pursuant to Rules 161(2) and 162-EP17835133.4, Mar. 6, 2019, 3 pgs.
HBL Holdings, LLC, Intention to Grant, EP17835133.4, Sep. 29, 2020, 8 pgs.
HBL Holdings, LLC, Decision to Grant, EP17835133.4, Apr. 2, 2021, 2 pgs.

* cited by examiner

VACUUM SEALABLE CONTAINER WITH INTERNAL PUMP MECHANISM

RELATED APPLICATIONS

This application is a continuation of U.S. patent application Ser. No. 17/094,714, filed Nov. 10, 2020, entitled "Vacuum Sealable Container with Internal Pump Mechanism," which is a continuation of U.S. patent application Ser. No. 15/658,330, filed Jul. 24, 2017, entitled "Vacuum Sealable Container with Internal Pump Mechanism," now U.S. Pat. No. 10,829,290, which claims priority to U.S. Provisional Patent Application No. 62/367,541, filed Jul. 27, 2016, entitled "Vacuum Sealable Container with Internal Pump Mechanism," and claims priority to U.S. Provisional Patent Application No. 62/482,022, filed Apr. 5, 2017, entitled "Vacuum Sealable Container with Internal Pump Mechanism," each of which is hereby incorporated by reference in its entirety.

TECHNICAL FIELD

This application relates generally to the storage of perishable consumables, and more specifically to a vacuum sealable container, which preserves the freshness and usable shelf life of the items therein.

BACKGROUND

Most consumables are perishable. Often, the mode of degeneration in taste, texture, or potency is directly related to air exposure. In some cases, the perceived quality of such attributes (the "freshness") can significantly drop in a matter of days in the presence of ambient air. This is well-known, and many commercial distributors of perishable consumables employ airtight packaging for their products to retard the decline in quality associated with air exposure. However, when these products are opened, a prompt decline in freshness begins.

In order to preserve freshness after opening product packaging, many airtight containers have been developed for home use to store perishable consumables. Such containers suffer drawbacks, and subsequently fall short in their ability to significantly impede the decline in freshness.

For instance, some containers are simply airtight. While an airtight seal can be effective in keeping additional air from coming in, these containers still contain ambient air which is replenished each time the container is opened. As a result, there is a continuous presence of ambient air, which contributes to the decline in freshness.

Other containers go a step further. They can be pumped to evacuate the ambient air. However, these containers require the use of a separate pumping device every time the container is closed. Regular usage patterns suggest that such an effort does not correlate with the routine task of closing a container when the effort involves handling extra parts (e.g., separate pumping hardware). As a result, this feature tends to be ignored. Many container pumps further require proximity to an electrical outlet (e.g., for electric pumps). These containers cannot be pumped when outdoors or on the move. Further, some containers come with separate pumping hardware, which requires unnatural up-and-down pumping movements (similar to those required for pumping air into a bicycle tire), requiring a hard surface to counteract the force of the pumping motions. As a result, the pumping mechanisms are burdensome to use.

Therefore, a need exists for a vacuum sealable container that both effectively and easily preserves the freshness of perishable consumables without the need for separate pumping hardware, access to electricity, or unnatural pumping movements.

SUMMARY

In accordance with some embodiments, a container lid with internal pump mechanism for vacuum sealing a container includes a base for interfacing with a container and a housing disposed over the base. The housing and base are rotatable with respect to each other. There is a bore coupled to the base, and the bore includes a one-way valve at a first end. The one-way valve allows air to enter through the first end of the bore and blocks air from leaving the first end of the bore. There is an opening at a second end, which allows air to both enter and leave through the second end of the bore. A piston is coupled to the housing, including a piston head having a complementary shape to an interior cavity of the bore. The piston is disposed inside the bore between the first end and the second end of the bore, and a limited compressive seal is disposed on the piston head. The seal forms an airtight seal upon actuation of the piston in a first direction away from the first end of the bore, and allows air to pass upon actuation of the piston in a second direction toward the first end of the bore. A chamber of air is enclosed by the bore, the one-way valve, and the piston head. Actuation of the piston in the first direction lowers air pressure inside the chamber causing air to enter the chamber through the one-way valve at the first end of the bore. Actuation of the piston in the second direction raises air pressure inside the chamber causing air to exit the chamber through the limited compressive seal disposed on the piston head.

In accordance with some embodiments, an internal pump mechanism for vacuum sealing an airtight cavity formed by a container and a lid includes a bore, disposed inside the container or the lid. The mechanism includes a first one-way seal, allowing air from the airtight cavity to enter the bore, and blocking air inside the bore from returning to the airtight cavity. The mechanism includes a second one-way seal, allowing air inside the bore to leave the bore without returning to the airtight cavity, and blocking air outside of the bore from entering the bore. The mechanism includes a piston, disposed inside the container or the lid, including a piston head having a complementary shape to an interior cavity of the bore and disposed inside the bore. A chamber of air is enclosed by the bore, the first one-way seal, the second one-way seal, and the piston head. Actuation of the piston in a first direction with respect to the bore lowers air pressure inside the chamber, causing air to evacuate the airtight cavity and enter the chamber through the first one-way seal. Actuation of the piston in a second direction with respect to the bore raises air pressure inside the chamber, causing air to exit the chamber through the second one-way seal.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
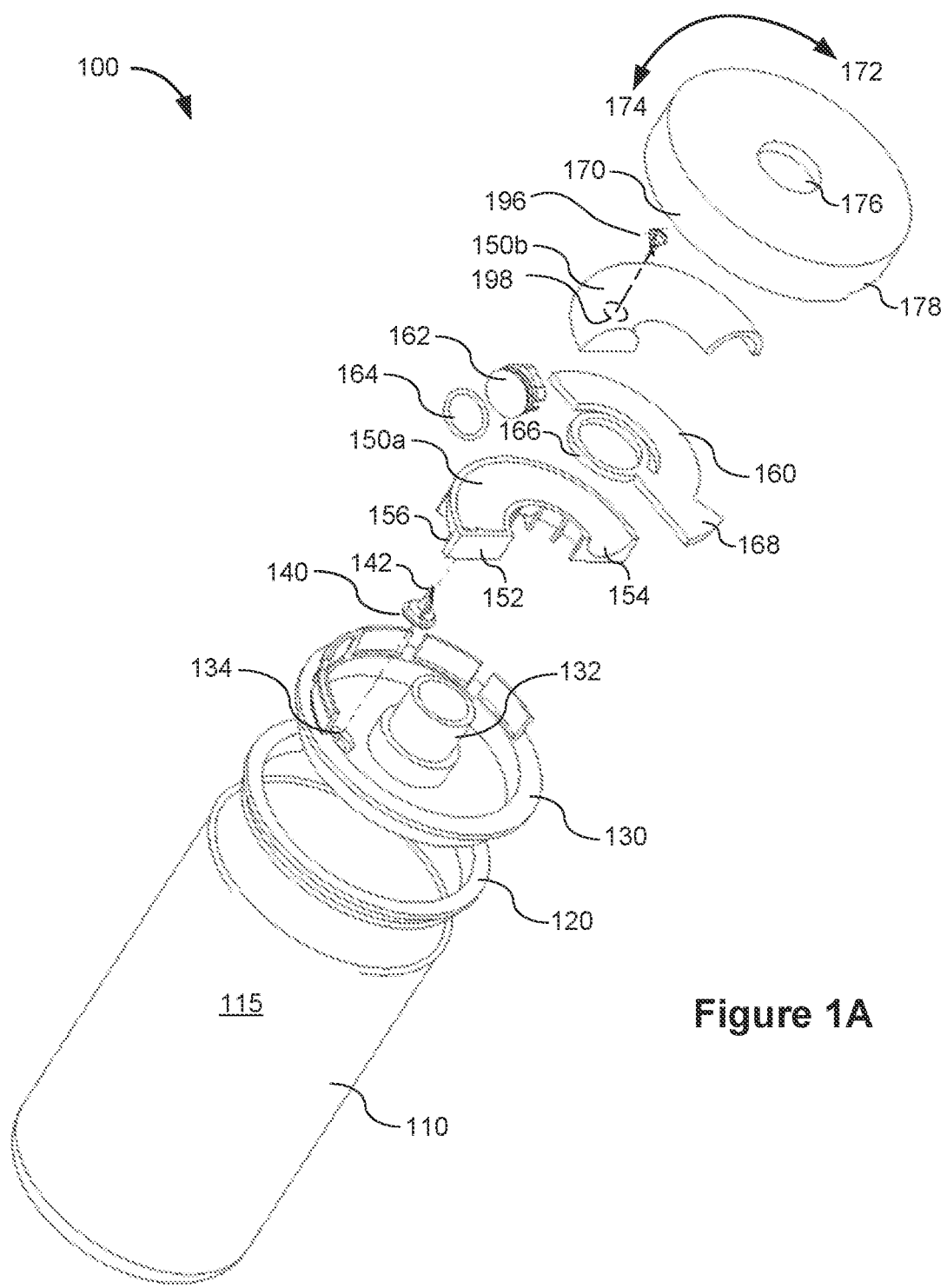
FIG. 1A depicts an exploded perspective view of a vacuum sealable container with an internal pump mechanism in accordance with some embodiments.

Attention is now directed toward FIG. 1A, which depicts an exploded perspective view of a vacuum sealable container system 100 in accordance with some embodiments. The system 100 includes a container 110 with an internal chamber 115, a seal 120, a base plate 130 including a support 132, and an aperture 134. The system also includes a one-way valve 140 with a disengagement feature 142, a bore 150 (see FIG. 2A) including a bottom piece 150a, a top piece 150b, a first end 152, a second end 154, and an aperture 156. Although depicted here as separate pieces, the bore is typically formed as a single physical component. The system includes a piston 160, including a head 162, a seal 164, a central aperture 166, and a tab 168. The lid 170 includes an aperture 176 and a groove 178. The lid may be rotated in a first direction 172 and a second direction 174.

In some embodiments, the container 110 has a geometrically symmetric body (e.g., a cylinder) enclosed on all sides and one end (e.g., the bottom), with an opening on the other end (e.g., the top). It is appreciated that containers can exist in different shapes and sizes, including squares and rectangles with sharp or rounded corners. The exact shape of the container is not limiting. The lid 170 has a complementary shape to the open end of the container, adapted to join with the container and create an airtight seal. For example, if the container 110 is a mason jar, the lid 170 is adapted to connect enclose an opening of the mason jar. In some embodiments, the lid 170 is disposed over the entire open end of container 110, as depicted in FIG. 1. However, in other embodiments, the opening in container 110 is located elsewhere or has a different shape relative to the end of the container, and lid 170 has a shape that is complementary to the opening in order to allow mating between the container and the lid. In some embodiments, the container 110 and the lid 170 are joined together with a mechanical connection, such as a latch, a clamp, or a catch. In some embodiments, the container 110 includes an elastomeric or otherwise shock or vibration absorbing material (such as a grommet or rubber grip) on a region of the container that makes resting contact with an external surface (such as a table or cup holder), acting as a buffer against unexpected impacts that may damage the container system.

In some embodiments, mating between the container 110 and the lid 170 (or portions thereof, such as the base plate 130) is accomplished with the seal 120, which stretches to fit over a portion of the lid 170 (or portions thereof, such as the base plate 130). In some embodiments, the seal 120 is a flexible rubber seal. Generally, the seal 120 comprises any material that provides for a compression seal between the container 110 and the lid 170 or portions thereof. In some embodiments, the container 110 has threading around the opening with which to engage the seal 120. In some embodiments, the seal 120 is omitted because the container 110 and the lid 170 are constructed of materials that allow for an airtight seal to form by virtue of their direct mating. Regardless of the configuration, when the container 110 and the lid 170 (or portions thereof) are mated, they form an airtight seal that preserves the integrity of a subsequently created internal vacuum, and the strength of this seal intensifies as the vacuum is created.

In some embodiments, the base plate 130 has a complementary shape to the lid 170 and serves as an anchoring portion of the lid as the lid rotates. Alternatively, if a user prefers to hold the lid 170 steady and rotate the container 110, the base plate 130 rotates along with the container, while the lid 170 serves as an anchor. For both of these cases, the container 110 and the lid 170 rotate with respect to each other. While the base plate 130 is mechanically coupled to the lid 170, the base plate 130 maintains alignment with the container as the container and the lid rotate with respect to each other. Therefore, parts that are affixed to the base plate 130 (e.g., the bore 150) rotate with respect to parts that are affixed to the lid 170 (e.g., the piston 160). In some embodiments, the support 132 is affixed to the base plate 130 and serves as a central rotational support, around which other features rotate. In some embodiments, the base plate 130 further includes an aperture 134, allowing for passage of air between the internal chamber 115 and a chamber inside the bore 150, as described below.

Figure 2A:
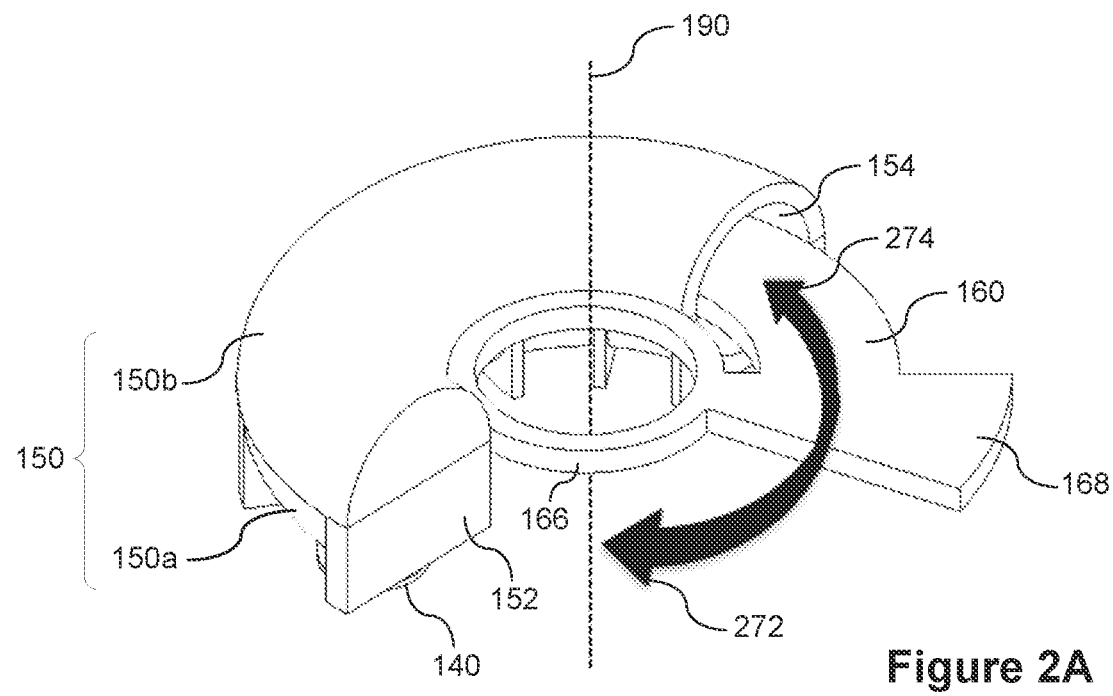
FIG. 2A depicts a perspective view of an internal pump mechanism assembly in accordance with some embodiments.

In some embodiments, the bore 150 (see FIG. 2A) comprises a bottom piece 150*a* and a top piece 150*b*, as depicted in FIG. 1A. A first end 152 of the bore is disposed in a vicinity of an aperture 134, and a second end 154 of the bore is disposed elsewhere. The bore 150 is depicted in FIGS. 1A and 2A as a portion of a toroidal tube disposed in a semicircle between the lid 170 and the base plate 130. Alternatively, the bore 150 can have a cross section of any shape, as long as the piston head 162 has a complementary shape. Further, while the semicircular footprint of the bore 150 is conducive to rotational operation of a piston, the shape of the bore's footprint can be any shape that accommodates rotational actuation of a piston. In some embodiments, the bore 150 further includes an aperture 156 disposed in a vicinity of the first end 152, and aligned with the aperture 134 in the base plate 130. The semicircular pieces 150*a* and 150*b* form a bore 150 that is toroidal (e.g., about half of a torus).

For embodiments in which the bore 150 is semicircular, the semicircular footprint spans a substantial portion of a circle, with a typical arc being as short as 130° or as long as 200°. In some embodiments, the arc of the semicircular bore is greater or less than these specific dimensions. The arc angle of the semicircular bore depends on design choice. For example, the shorter the bore, the less capacity for air evacuation. However, the longer the bore, the more torque is required for actuating the piston through the full length of the bore.

In some embodiments, a one-way valve 140 is disposed between, on, or around the apertures 134 and 156, and is configured to allow air to leave the chamber 115 through the aperture 134 and enter the bore 150 through the aperture 156. The one-way valve 140 is further configured to block air from traveling in the opposite direction through the apertures 156 and 134, which keeps air in the bore 150 from returning to the internal chamber 115. However, in some embodiments, the one-way valve 140 includes a disengagement feature 142. When activated by the piston head 162, the disengagement feature 142 opens the valve 140 and allows air to travel through the apertures 134 and 156 in both directions, as discussed below.

In some embodiments, the piston 160 is disposed inside the bore 150, between the lower piece 150*a* and the upper piece 150*b*. For embodiments in which the bore 150 is a semicircular bore, the piston head 162 is semicircular and the piston has a shape and a length complementary to the bore. In some embodiments, the piston 160 includes a central aperture 166, which is disposed around the support 132. The central aperture 166 is configured to facilitate rotational actuation of the piston as the central aperture 166 rotates about the support 132. Additionally or alternatively, the piston 160 can include any supporting structure that facilitates movement of piston head 162 through the interior of the bore, as long as the supporting structure allows the piston to move in two opposing directions (e.g., back and forth) through the inside of the bore. In some embodiments, the piston 160 includes a tab 168, which, when disposed in a groove 178 of the lid 170, affixes the piston to the lid, rotationally coupling the piston 160 to the lid 170. This allows a user to actuate the piston 160 through the bore simply by rotating the lid 170 (to which the piston is rotationally coupled) with respect to the container 110 and the base plate 130 (to which the bore is rotationally coupled).

Figure 1B:
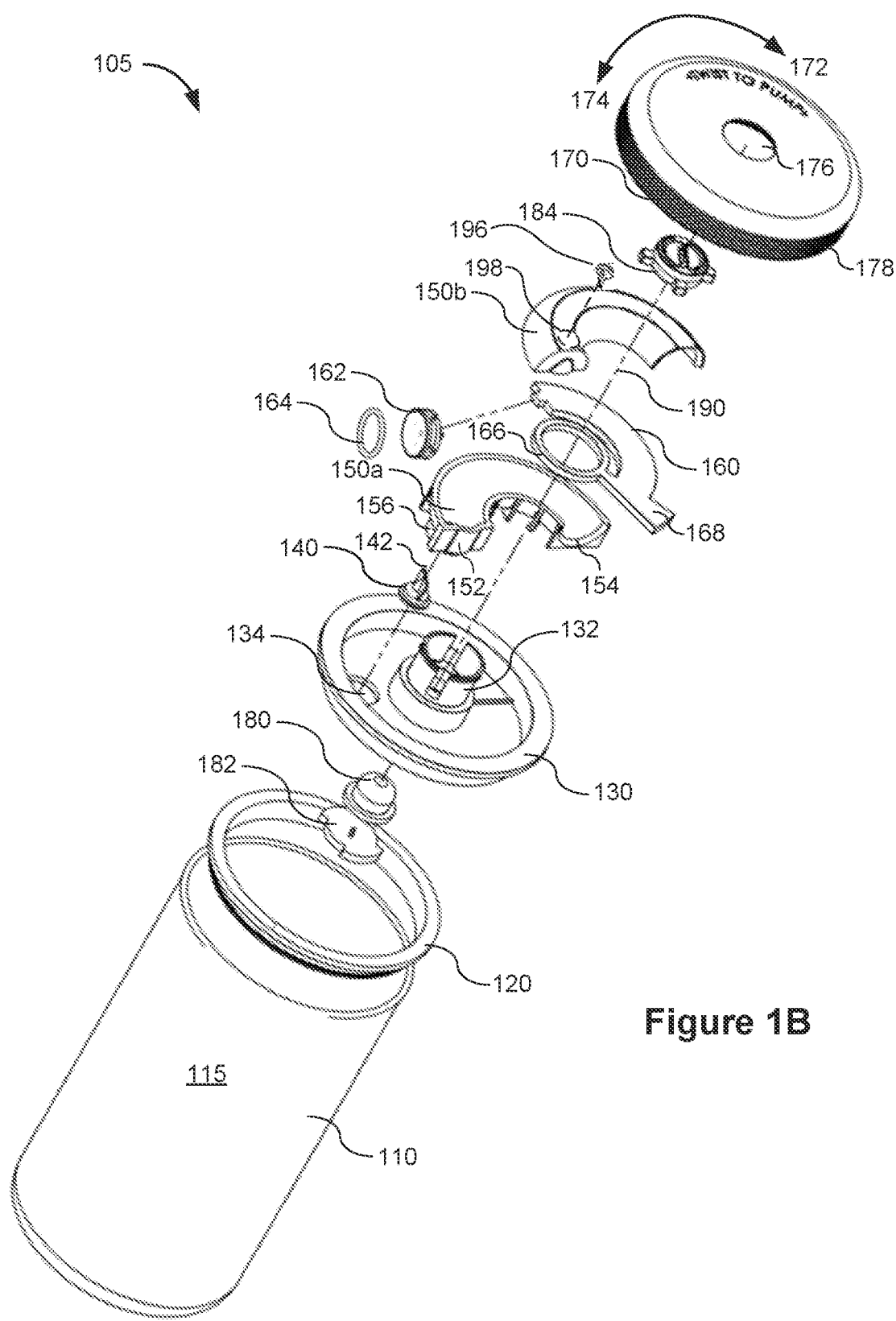
FIG. 1B depicts an exploded perspective view of a vacuum sealable container with an internal pump mechanism and dome valve in accordance with some embodiments.

FIG. 1B depicts an exploded perspective view of a vacuum sealable container system 105 including an optional dome valve release system in accordance with some embodiments. Features shared with FIG. 1 are similarly numbered, and some are not further discussed for purposes of brevity. The system 105 additionally includes a dome valve 180, a compression disk 182, and a push button 184. In some embodiments, the dome valve 180 is seated concentrically within the support 132 along a central axis 190, between the compression disk 182 and the push button 184. In some embodiments, the dome valve 180 is a flexible rubber valve. However, it is appreciated that the dome valve 180 can be constructed out of any flexible material that allows it to be compressed. When the dome valve 180 is closed, the valve creates an air-tight seal through which air cannot flow. In some embodiments, the dome valve 180 is normally closed until a user depresses the push button 184. Downward depression of the push button 184 opens the dome valve 180, which allows air to pass through the valve, thereby relieving any vacuum that may be present in the container 110. (As recognized by one of skill in the art, the presence of a "vacuum" means that there is lower air pressure in the container 110 than outside the container.) Absent a vacuum, the lid 170 can be opened by the user. However, when a vacuum is present in the container 110, the lid 170 cannot be opened by the user (not without substantial force). Therefore, when the system 105 is vacuum sealed, depression of the push button 184 (e.g., by a user's finger) relieves the vacuum and allows the lid to be opened. In some embodiments, the valve 180 is not a dome valve, and instead is any type of one-way valve that can be opened upon an externally-exerted pressure (e.g., by depression of a push button). While the push button 184 is depicted in FIG. 1B as being located in the center of the lid 170, it is appreciated that a push button and valve system may alternatively be located in other locations of the lid, such as non-concentric locations on the top or side faces of the lid. In some embodiments, the push button 184 includes a lock, which requires a non-intuitive motion (e.g., a push-and-rotate motion) in order to prevent a child or person not familiar with such a motion from being able to relieve the vacuum and open the lid.

In some embodiments, a seal 164 is affixed to the piston head 162. As the piston head 162 moves in a first direction 272, the seal 164 forms a seal between the piston head and the interior of the bore. This blocks air from passing from one side of the piston head to the other. As the piston head 162 moves in a second direction 274, the seal 164 opens and allows air to pass in both directions between the piston head and the interior of the bore. In some embodiments, the seal 164 is a flexible rubber O-ring which is stretched to fit in a groove on the piston head 162. As the piston head moves in the first direction, the O-ring acts as a seal and blocks air from moving from one side of the piston head to the other. As the piston head moves in the second direction, the O-ring slips into the channel allowing air to pass between the piston head and the interior of the bore. As an alternative to a seal 164, a bore 150 can include any other means to block air from leaving the bore as the piston moves in one direction, and to allow air to leave the bore as the piston moves in another direction. For instance, in some embodiments, the bore 150 includes a second one-way valve (196), disposed between the piston head 162 and the first end 152 of the bore (on, or around the aperture 198), which is configured to allow air to leave the bore (and exit the lid) but not reenter the bore. For the purposes of this application, a one-way valve 140, a seal 164, an alternative second one-way valve (196), or any other structure configured to allow the flow of air in one direction while blocking the flow of air in the opposite direction are all referred to as a "one-way seal."

In some embodiments, the lid 170 is configured to mate to the base plate 130. The mating can be accomplished by the lid and the base plate snapping to each other, or by any other process that allows the lid and the base plate to be coupled to each while still being allowed to rotate with respect to each other. In some embodiments, the lid 170 includes an aperture 176, which is disposed on or around the support 132, and allows the lid to rotate in opposite directions 172 and 174 around the central long axis of the device. In some embodiments, the groove 178 is aligned with the tab 168, which rotationally couples the piston 160 to the lid 170. In other words, as the user rotates the lid, the piston rotates along with the lid because the tab 168 moves along with the groove 178.

Figure 2B:
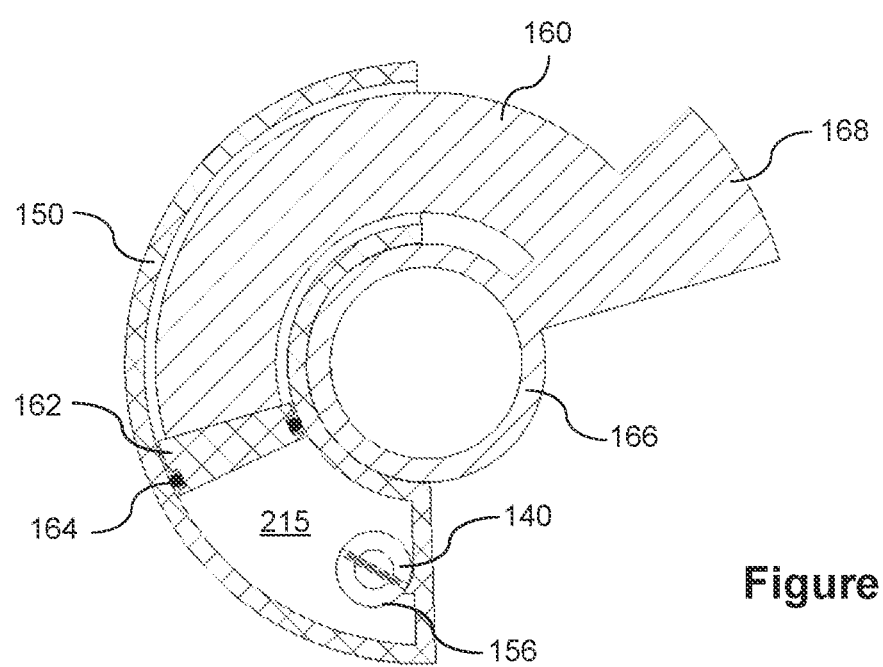
FIG. 2B depicts a cross section view of an internal pump mechanism assembly in accordance with some embodiments.

FIG. 2A depicts a perspective view and FIG. 2B depicts a cross section view of an internal pump mechanism assembly in accordance with some embodiments. Features shared with FIGS. 1A and 1B are similarly numbered, and some are not further discussed for purposes of brevity. In some embodiments, the piston 160 rotationally actuates in a first direction 272 and a second direction 274 through the bore 150 about the central axis 190. The piston head 162 and O-ring seal 164 form a limited compressive seal with the inner walls of the bore. The piston head 162, the seal 164, the valve 140, and the inner walls of the bore 150 form a chamber of enclosed air 215.

When the piston 160 actuates in the first direction 272, the seal 164 prevents air from escaping, and the volume of the chamber 215 increases (due to the piston head moving farther away from the bore wall 152). As the volume of the chamber 215 increases, the volume of air inside the chamber 215 initially remains the same (because it is blocked from leaving the chamber by the valve 140 and the seal 164), thereby causing a decrease in air pressure inside the chamber 215. The decrease in air pressure causes air to be drawn out of the container chamber 115 and into bore chamber 215 through valve 140.

When the piston 160 subsequently actuates in the second direction 274, the volume of bore chamber 215 decreases (due to the piston head moving closer to the bore wall 152). As the volume of the bore chamber 215 decreases, the volume of air inside bore chamber 215 initially remains the same (due to being blocked from leaving the chamber by the valve 140 and the seal 164), thereby causing an increase in air pressure inside the bore chamber 215. The increase in air pressure causes the O-ring seal 164 to slip within its groove on the piston head 162 (or alternatively, causes a second valve to open), allowing air inside the bore chamber 215 to bypass the piston head (or alternatively, leave through the second valve). The air that passes to the other side of the piston head is then free to leave through the end 154 of the bore, and eventually into the surrounding environment 415 (see FIG. 4).

Alternatively, when the piston 160 subsequently actuates in the second direction 274, the O-ring seal 164 slips within its groove due to friction on the seal caused by the inner walls of the bore and the seal's placement within the groove, thereby allowing air to bypass the piston head 162, leave the bore through the end 154, and eventually exit to the surrounding environment 415. When the piston subsequently actuates in the first direction 272, the O-ring seal 164 once again becomes closed.

The piston's completion of an actuation in the first direction 272 and a subsequent actuation in the second direction 274 along the internal face of the bore completes a cycle.

In some embodiments, the one-way valve 140 is rendered open if the piston head 162 collides with a disengagement feature 142. In other words, if the user actuates the piston in the first direction 272 until the piston head reaches the end of the bore, the valve 140 opens and thereby decompresses the container chamber 115, which relieves any pressure differential and allows the user to open the container. In embodiments that include a dome valve, the piston head 162 is optionally prevented from making contact with the valve 140 (e.g., by a standoff in the bore end 152 preventing the piston 160 from actuating all of the way toward the bore end 152), leaving the dome valve as the preferred depressurizing option. However, in some embodiments, both options (e.g., the disengagement feature option and the dome valve option) are available, and the piston head 162 is not prevented from colliding with the disengagement feature 142.

Figure 3:
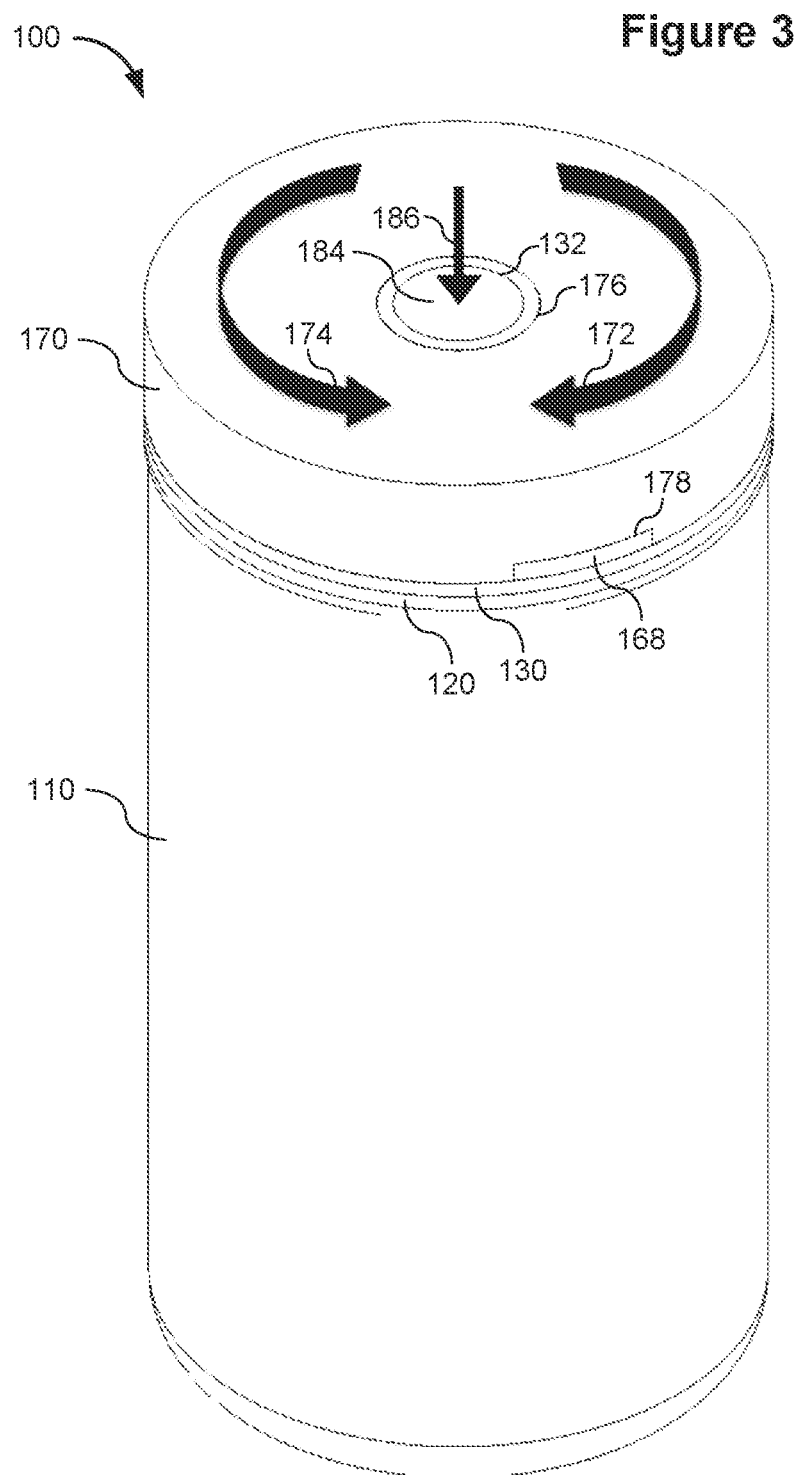
FIG. 3 depicts a perspective view of an assembled vacuum sealable container with an internal pump mechanism in accordance with some embodiments.

FIG. 3 depicts a perspective view of an assembled device according to some embodiments. In this configuration, when the lid 170 is concentric and coincident with the open end of the container 110, the lid is closed, creating an airtight seal comprising the container 110, the seal 120, the base plate 130, and the lid 170. When a user rotates in the directions 172 and 174, the groove 178 actuates the piston by way of the tab 168, which rotates the piston with respect to the base plate 130. In the embodiment depicted in FIG. 3, the support 132 enables rotational movement of the lid 170 by way of the aperture 176. However, it is appreciated that alternative structures are capable of supporting rotation of a lid with respect to a base plate, and that the exact support structure depicted in FIG. 3 is not limiting. In embodiments including a dome valve system as depicted in FIG. 1B, downward force applied to the push button 184 in the downward direction 186 depressurizes the container.

Figure 4A:
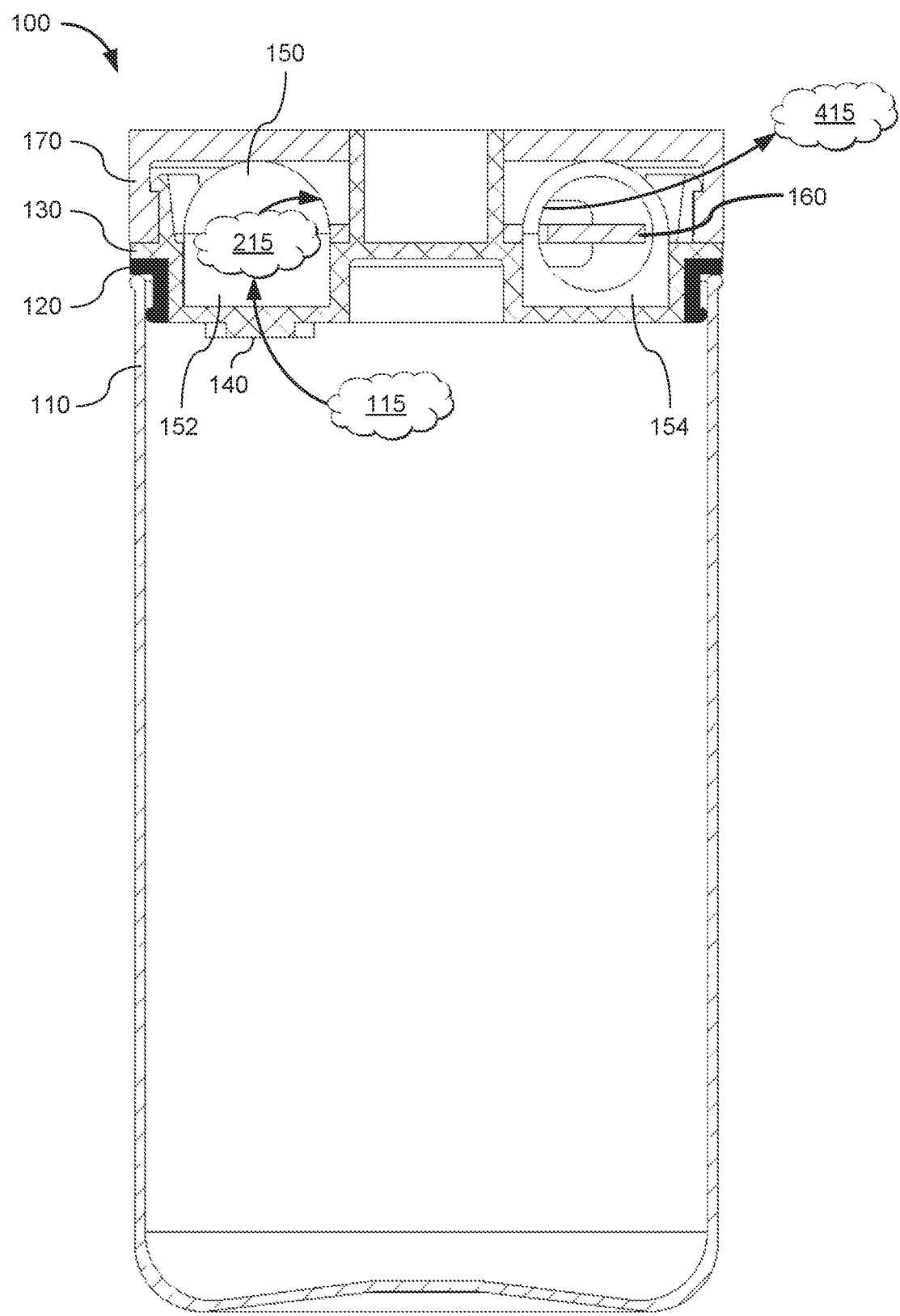
FIG. 4A depicts a cross section view of an assembled vacuum sealable container with an internal pump mechanism in accordance with some embodiments.

FIG. 4A illustrates a cross section view of an assembled device 100 according to some embodiments. Features shared with FIGS. 1A, 1B, 2A, 2B, and 3 are similarly numbered, and some are not further discussed for purposes of brevity. As depicted in FIG. 4A, a volume of air in the container chamber 115 is drawn through a valve 140 into the bore chamber 215 upon actuation of the piston in a first direction. The volume of air is subsequently drawn out of the bore chamber 215 and into the surrounding environment 415, completing a cycle. For each subsequent cycle, more air is drawn out of the container chamber 115, leaving less air inside of the container and thereby maintaining freshness of any perishable contents.

Figure 4B:
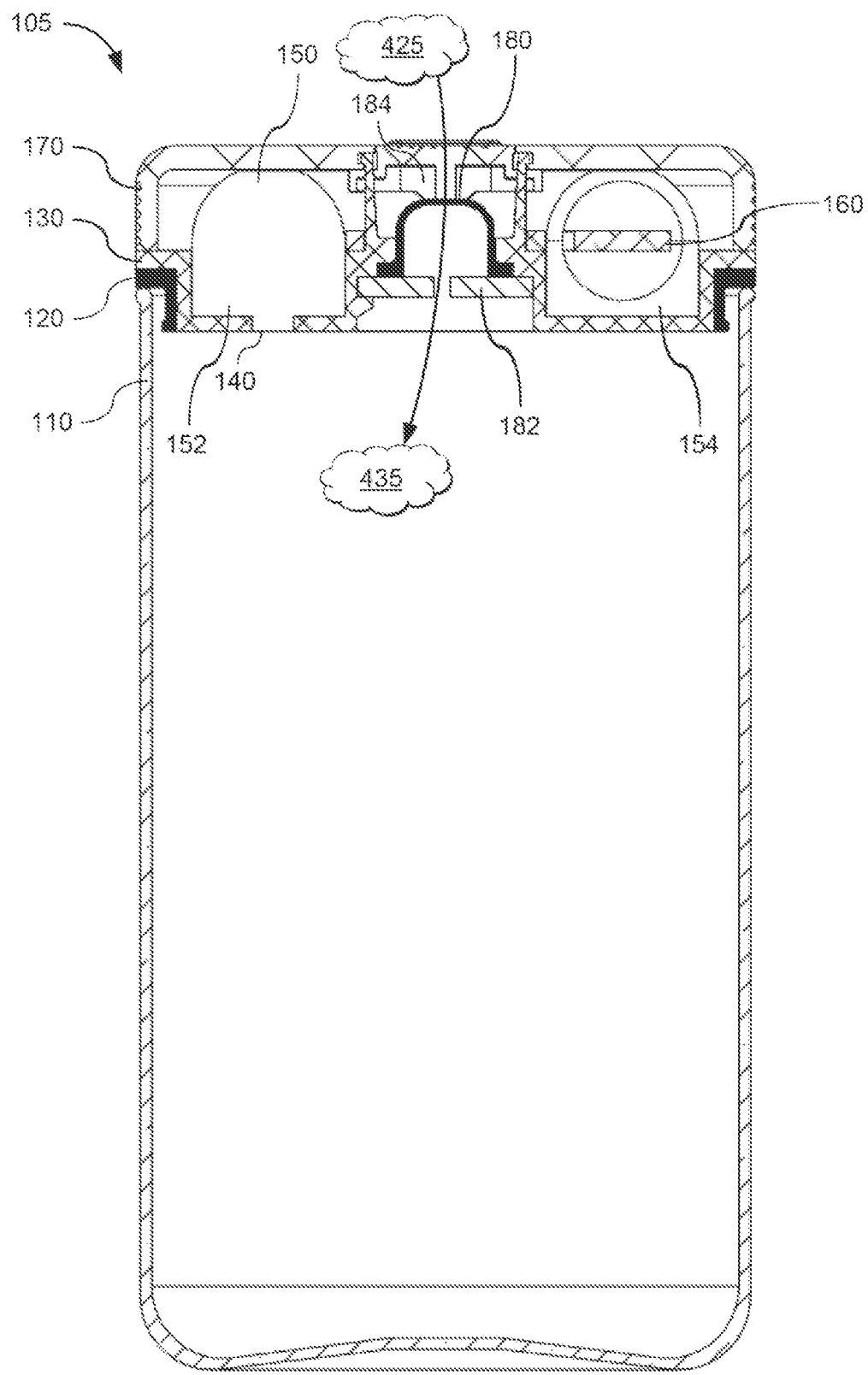
FIG. 4B depicts a cross section view of an assembled vacuum sealable container with an internal pump mechanism and dome valve in accordance with some embodiments.

FIG. 4B illustrates a cross section view of an assembled device 105 including a dome valve system according to some embodiments. Features shared with FIG. 4A are similarly numbered, and some are not further discussed for purposes of brevity. As depicted in FIG. 4B, the dome valve 180 is compressed between the push button 184 and the compression disk 182. Downward depression of the push button 184 causes the dome valve 180 to open, allowing air from the surrounding environment 425 to be drawn into the container through the dome valve (depicted as air 435), thereby depressurizing the container. As illustrated in FIG. 4B, when the lid 170 is on the container 110, the bore 150 is at least partially inside the container 110.

Figure 5:
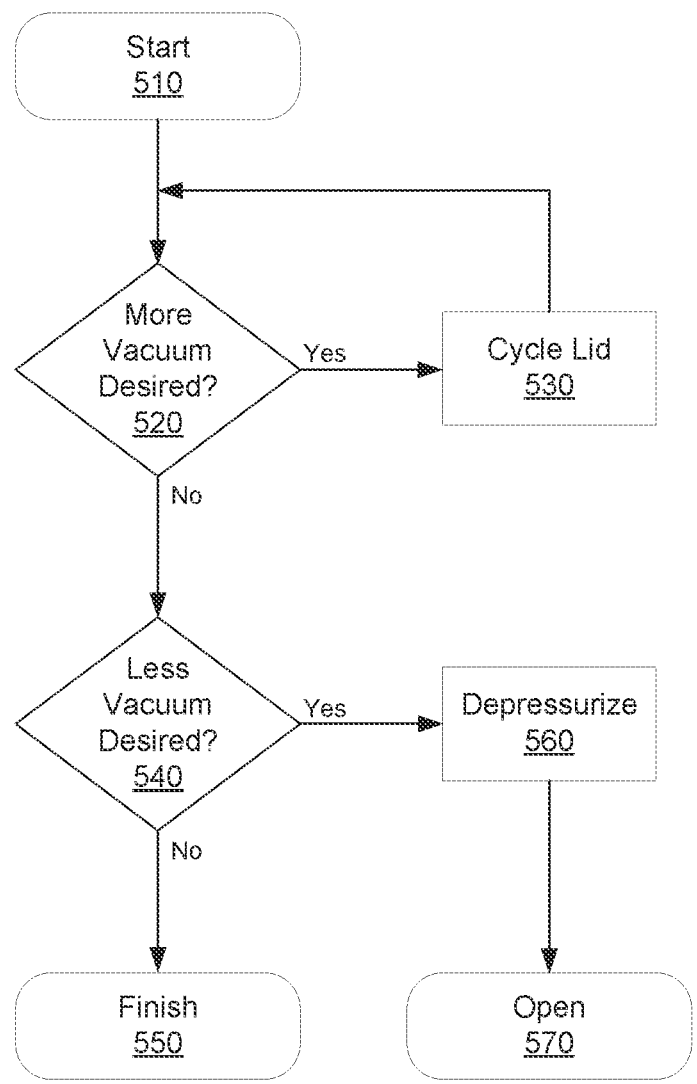
FIG. 5 depicts a method of using a vacuum sealable container with an internal pump mechanism in accordance with some embodiments.

FIG. 5 depicts a method 500 of using a vacuum sealable container with an internal pump mechanism in accordance with some embodiments. The method begins at step 510, when a user decides to seal the container and begin evacuating air. Initially, the air pressure inside the container is the same as the air pressure outside the container. In step 520, the user decides if more vacuum is desired (i.e., whether to evacuate more air from the container). If yes, the user grasps the lid in step 530 and applies an alternating torque about the central long axis to cycle the pump. The user may complete as many cycles as necessary to achieve a desired vacuum, which is dependent on the volume of the container. When such vacuum is achieved, the lid remains fixed to the container. In step 540, the user decides if less vacuum is desired (i.e., whether the sealing process is finished or the user wants to open the container). If the user is satisfied with the vacuum level, no further action is required and the user is finished in step 550. However, if the user decides to open the container, the user depressurizes the container in step 560 by activating a disengagement feature as discussed in reference to FIG. 1A, a dome valve as discussed in reference to FIGS. 1B and 4B, or a combination thereof, thereby allowing the user to open the container in step 570.

By integrating a hand-powered pumping mechanism into a container lid, the various embodiments disclosed herein provide a vacuum sealable container that is both effective (e.g., by removing ambient air from the interior of the container, thereby creating a vacuum) and easy to use (e.g., by leveraging natural motions inherent in screwing or twisting on a convention lid, by not requiring additional parts external to the container and lid, and by not requiring proximity to an electrical outlet).

While preferred materials for elements have been described, the device is not limited by these materials. Plastics, rubbers, metals, woods, and other materials may comprise some or all of the elements of the various embodiments of a vacuum sealable container described herein. Further, while embodiments of an internal pump mechanism have been described as being integrated into a container lid, it will be readily apparent to those of ordinary skill in the art that embodiments of an internal pump mechanism can alternatively be integrated into a container, or can be integrated into a separate stand-alone module that is configured for use with a separate container, a separate lid, or both a separate container and a separate lid.

While the various embodiments above have been described as operating without the need for electronic features such as powered pumps, various embodiments optionally include electronic components in or in proximity to a portion of the lid, the container, or a combination thereof. In some embodiments, the electronics include a printed circuit assembly with various electronic components, enabling other features (e.g., an electronic pressure sensor). In some embodiments, the electronics enable network connectivity. For example, some embodiments include a printed circuit assembly with an antenna that allows the container system to send and/or receive data from external devices (e.g., using WiFi or Bluetooth). In some embodiments, the data sent includes pressure readings (e.g., data from a pressure sensor, a barometer, or a hygrometer located inside or in proximity to a pressurized chamber of the container system) and/or timer readings (e.g., data pertaining to how long the container has been pressurized). In some embodiments, the data received includes a command for controlling an optional actuator to open a release valve. Additionally or alternatively, the electronics include one or more features (e.g., speakers, light emitting diodes, or any other sound or light source) that produce auditory, visual, and/or tactile notifications at certain times to produce feedback relating to events. In some embodiments, the events include completion of a pump cycle, loss of pressure, and/or a passed threshold relating to temperature, pressure, vapor, or volume inside or in proximity to a pressurized chamber of the container system. In some embodiments, the container 110 varies in opacity. For embodiments in which a portion of the container is translucent, the electronics optionally include a light source for illuminating an interior portion of the container. For some of the previously described embodiments, the electronics are powered by an internal power supply such as a disposable or rechargeable battery.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of vacuum sealing an airtight cavity formed by a container and a lid, comprising:
    applying a first torque to the lid in a first rotational direction with respect to a central axis of the container, the first torque causing the lid to rotate in the first rotational direction with respect to the container, wherein the rotation of the lid in the first rotational direction actuates a semicircular piston, coupled to a moving portion of the lid, away from a first one-way seal disposed in a toroidal bore; and
    applying a second torque to the lid in a second rotational direction, opposite of the first rotational direction, with respect to the central axis of the container, the second torque causing the lid to rotate in the second rotational direction with respect to the container, wherein the rotation of the lid in the second rotational direction actuates the piston toward the first one-way seal disposed in the toroidal bore; wherein:
        actuation of the piston away from the first one-way seal causes a volume of air to evacuate the airtight cavity and enter the toroidal bore through the first one-way seal; and
        actuation of the piston toward the first one-way seal causes the volume of air to leave the toroidal bore through a second one-way seal without reentering the airtight cavity.

2. The method of claim 1, wherein the toroidal bore is coupled to a nonmoving portion of the lid.

3. The method of claim 1, further comprising:
    applying one or more successive cycles of the first torque and second torque, wherein each successive cycle of the first torque and the second torque successively evacuates an additional volume of air from the airtight cavity.

4. The method of claim 1, further comprising:
aligning the piston head with a disengagement feature coupled to the first one-way seal, wherein the aligning relieves pressure in the airtight cavity by allowing air to bypass the first one-way seal in both directions.

5. The method of claim 1, further comprising
depressing a dome valve seated concentrically within a support along a central axis of the lid, wherein the depressing relieves pressure in the airtight cavity.

6. The method of claim 5, wherein the dome valve is seated concentrically within a support along a central axis of the lid.

7. The method of claim 1, wherein:
the first one-way valve is positioned to draw air from the container into the airtight cavity; and
the second one-way valve is positioned to release air from the cavity into external environs.

\* \* \* \* \*